Nov. 26, 1968  L. H. BOWEN III, ET AL  3,413,498
ELECTRICALLY POWERED HAND TOOL
Filed Aug. 9, 1965  3 Sheets-Sheet 1
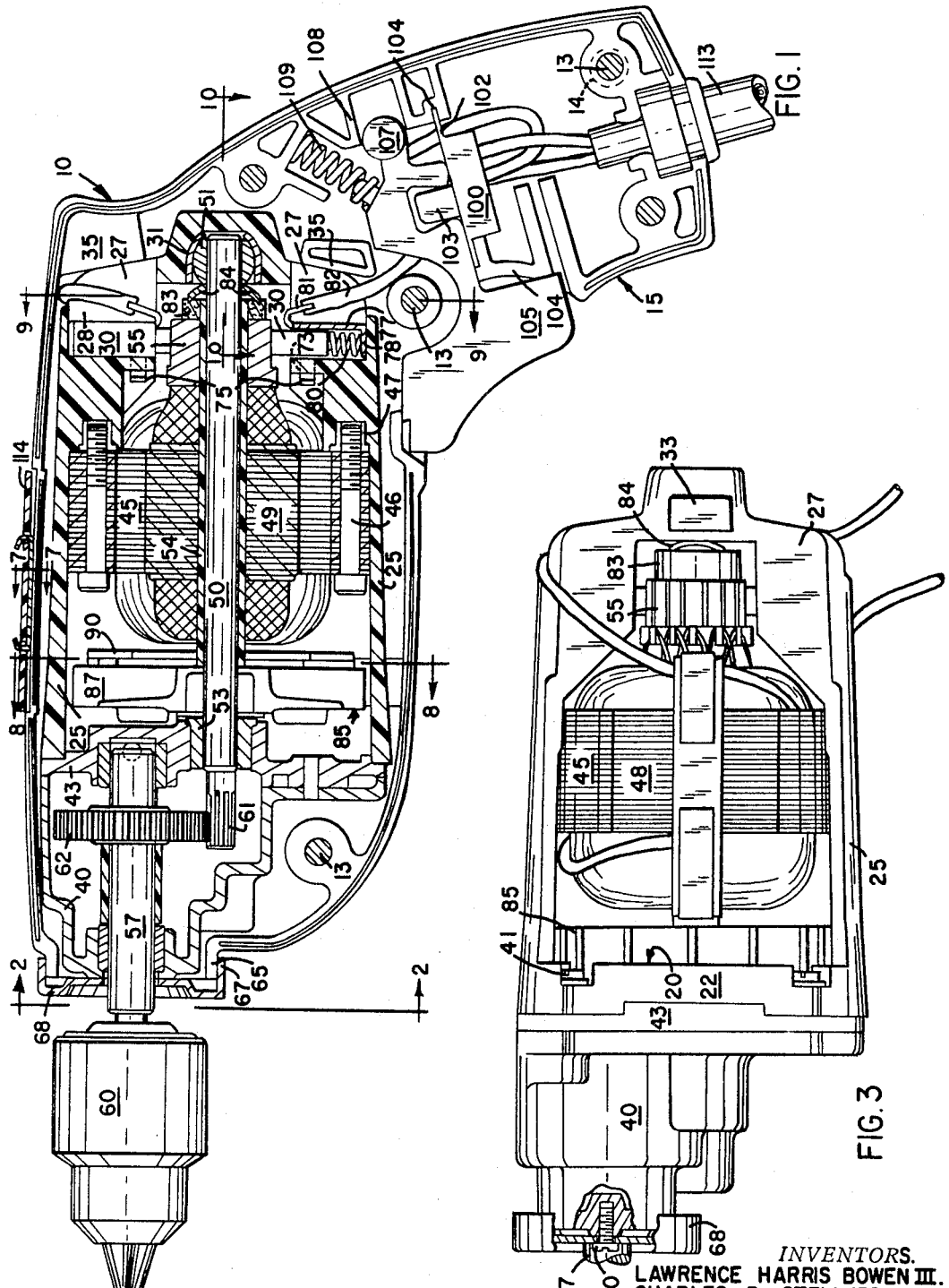
INVENTORS.
LAWRENCE HARRIS BOWEN III.
CHARLES R. STELLJES.
BY
D. Emmett Thompson
ATTORNEY.

Nov. 26, 1968        L. H. BOWEN III, ET AL        3,413,498
ELECTRICALLY POWERED HAND TOOL
Filed Aug. 3, 1965        3 Sheets-Sheet 2
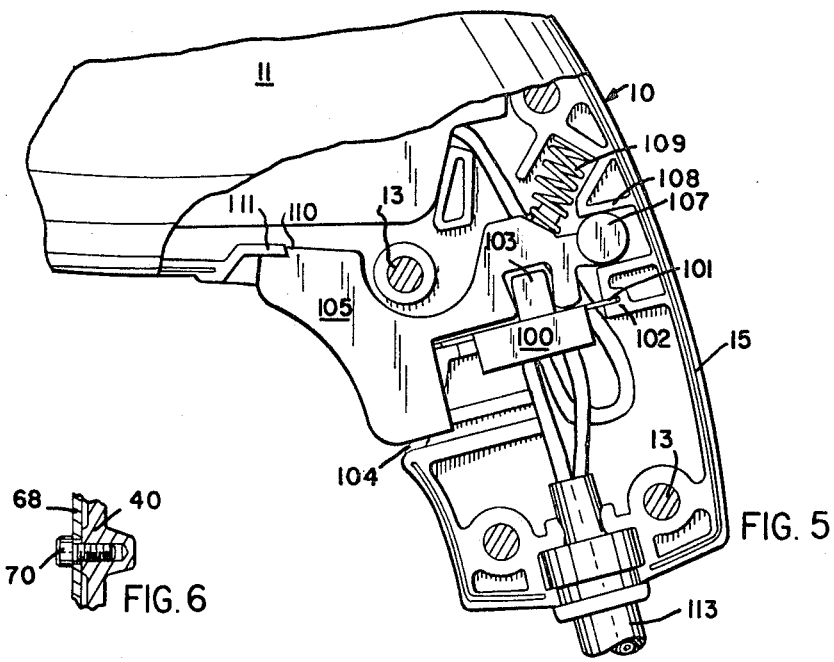
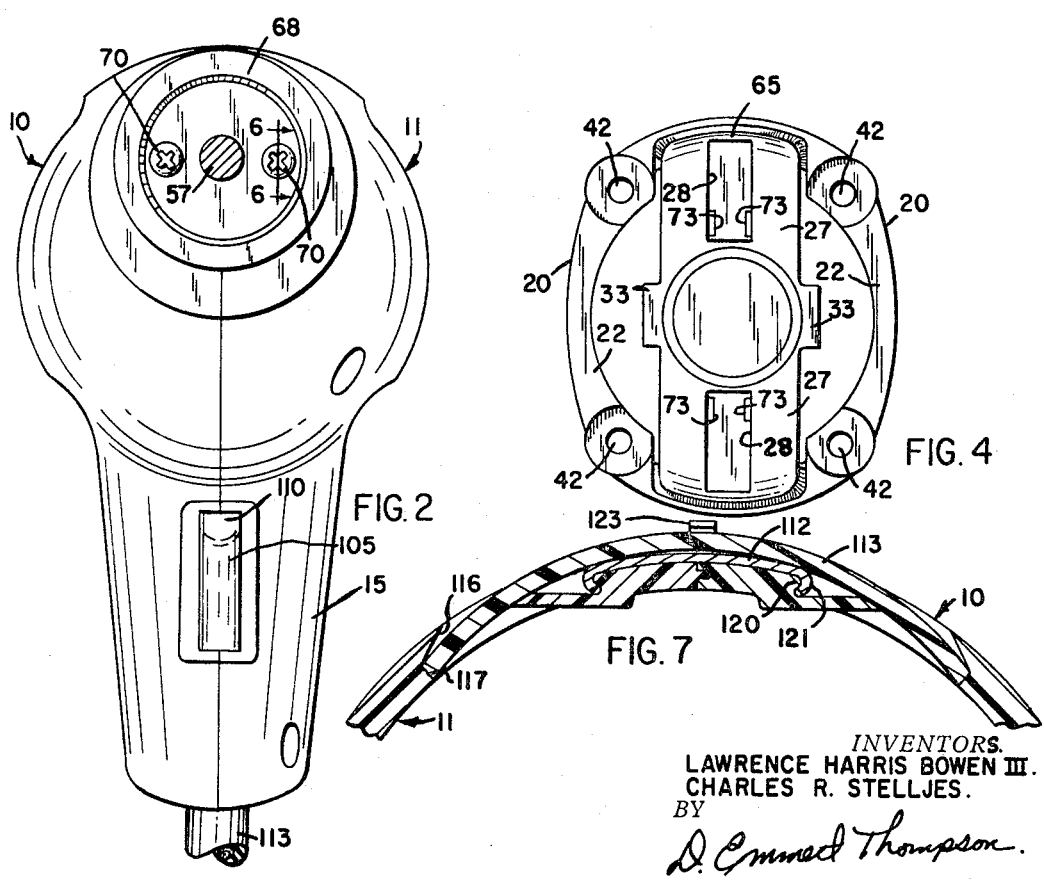
INVENTORS.
LAWRENCE HARRIS BOWEN III.
CHARLES R. STELLJES.
BY
D. Emmett Thompson
ATTORNEY.

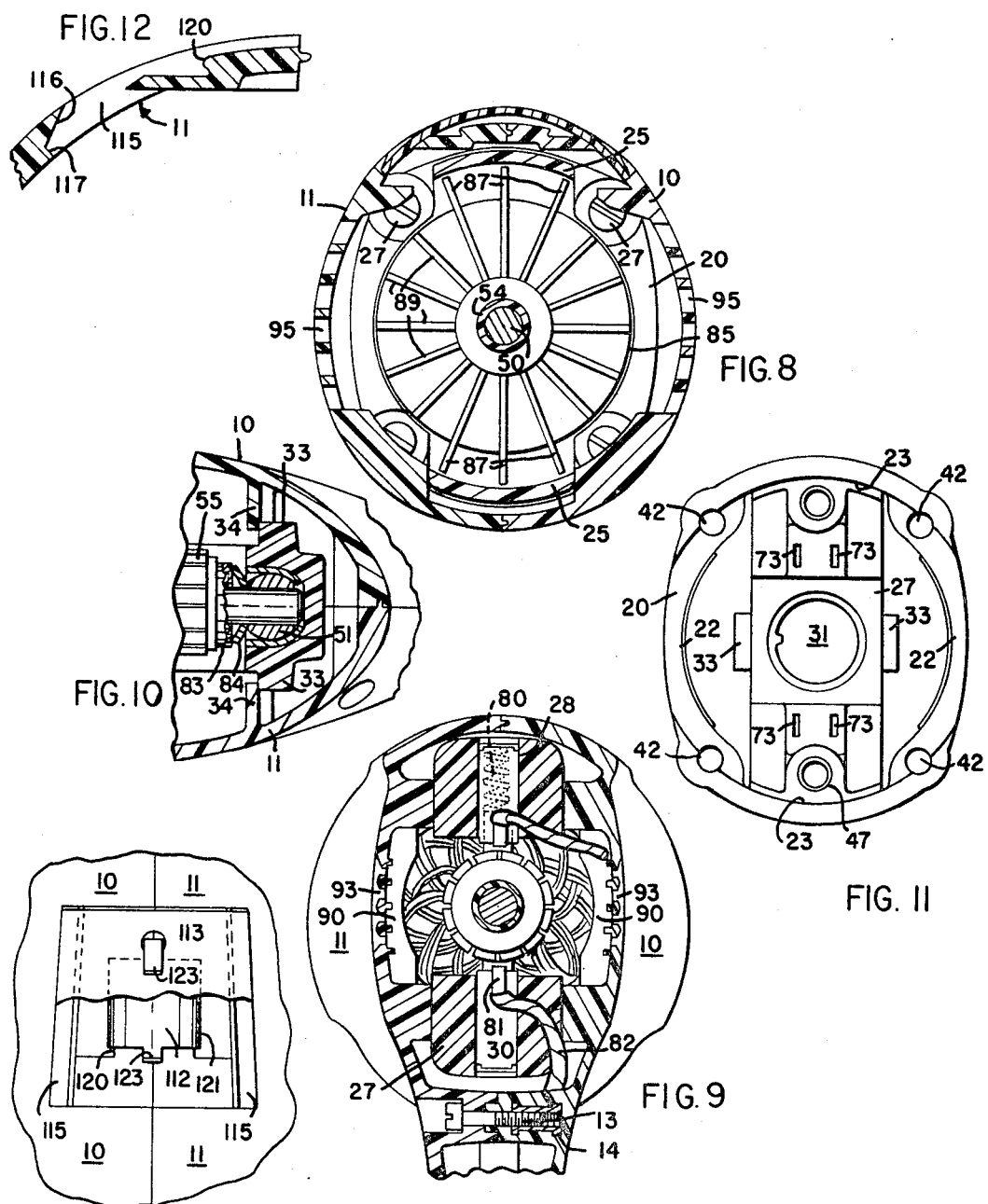

United States Patent Office 3,413,498
Patented Nov. 26, 1968

3,413,498
ELECTRICALLY POWERED HAND TOOL
Lawrence Harris Bowen III, North Syracuse, and Charles R. Stelljes, Fayetteville, N.Y., assignors to Rockwell Manufacturing Company, Pittsburgh, Pa., a corporation of Pennsylvania
Filed Aug. 9, 1965, Ser. No. 478,039
7 Claims. (Cl. 310—47)

This invention relates to electrically powered hand manipulated tools and has as an object such a tool embodying an improved structural arrangement, which provides double insulation between the current carrying components of the tool and the outer surface of the tool engaged by the hands of the operator.

The invention has as a further object an electrically powered hand manipulated tool embodying an improved arrangement for locking the power supply switch in the "on" position.

The invention consists in the novel features and in the combinations and constructions hereinafter set forth and claimed.

In describing this invention, reference is made to the accompanying drawings in which like characters designate corresponding parts in all the views.

In the drawings:

FIGURE 1 is a longitudinal view of an electrically powered hand tool embodying the features of my invention, one side, or section, of the casing being removed, and with portions of the power unit shown in section.

FIGURE 2 is a front end elevational view taken on the line corresponding to line 2—2, FIGURE 1.

FIGURE 3 is a side elevational view of the power unit.

FIGURE 4 is a rear end elevational view of the power unit frame.

FIGURE 5 is a view similar to the lower right portion of FIGURE 1, illustrating the power circuit switch locked in "on" position.

FIGURE 6 is a fragmentary sectional view taken on line 6—6, FIGURE 2.

FIGURE 7 is an enlarged sectional view of the top portion of the casing taken on line 7—7, FIGURE 1.

FIGURE 8 is a sectional view taken on line 8—8, FIGURE 1.

FIGURE 9 is a sectional view taken on line 9—9, FIGURE 1.

FIGURE 10 is a sectional view taken on line 10—10, FIGURE 1.

FIGURE 11 is a front end elevational view of the power unit frame.

FIGURE 12 is a view, similar to FIGURE 7, showing the top portion of one casing section in section, with the name plate and clip omitted.

FIGURE 13 is a fragmentary top plan view of the medial top portion of the casing with a portion of the name plate broken away.

The power tool comprises a casing consisting of complemental mating sections 10, 11, molded from plastic insulating material. The casing sections are secured together partially by bolts 13, which extend through apertures formed in one of the sections, as section 11, and threading into metallic inserts 14 embedded in the other section, as 10, see FIGURES 1 and 8. The sections 10, 11, when joined together in abutting relation, as by the fasteners 13, provides a compartment, in which a power unit is mounted, and also forms a depending pistol-grip type handle portion 15. The power unit includes a one-piece integral frame molded from plastic insulating material and having a front ring portion 20 formed with a vertical dimension greater than the horizontal dimension thereof, see FIGURES 3, 4 and 11.

As seen more clearly in FIGURE 11, the inner curved surfaces 22 of the side portions of the ring structure 20 are formed on a radius shorter than are the inner curved surfaces 23 at the bottom and top of the ring. The frame further includes a pair of ribs 25 connected at the upper and lower areas of the ring member 20, and extending rearwardly therefrom in spaced apart, substantially parallel relation. The ribs 25 merge at their rear ends with a vertically disposed rear end wall 27, formed with slots 28 for receiving brush holders 30. The end wall 27 is formed with a central cavity 31 for receiving an armature shaft bearing.

The end wall 27 is formed in its central portion, at opposite sides of the cavity 31, with projections 33. Each of the casing sections 10, 11, are formed with inwardly extending walls 34, see FIGURE 10, for engagement with the forward sides of the projections 33. The sections 10, 11, are also formed with vertically disposed walls 35 engaged by the rear end surfaces of the frame rear wall 27 at the sides of the brush holder slots 28, see FIGURE 1. With this arrangement, the power unit is trapped against movement in a direction lengthwise of the casing.

A gear housing 40 is fixedly assembled to the forward ring portion 20 of the frame by screws 41 extending through apertures 42 in the forward ring portion, and through aligned apertures formed in a plate 43 and threading into the gear housing 40. A motor field 45 is positioned between the ribs 25, and is fixedly secured to the frame, as by bolts 46, extending through the field member and threading into bushings 47 embedded in the rear end wall portion of the frame. The field 45 is formed with diametrically flat peripheral surfaces 48, see FIGURE 3, and the intermediate areas of the field periphery are curved and formed on a radius complemental to the spacing between the ribs 25.

An armature 49 is mounted on a shaft 50, journalled at one end in a self-aligning bearing 51 mounted in the cavity 31 of the frame rear wall. The opposite end of the shaft is journalled in a bearing 53 mounted in the intermediate plate 43, the end of the armature shaft 50 extending into the gear housing 40. The shaft 50 is encircled by a sleeve 54 of insulating material to completely insulate the armature 49 and the windings carried thereby, and including the commutator 55, from the shaft 50. An output shaft 57 is journalled in the gear housing 40 and extends forwardly therefrom and may be provided with a tool attaching member, such as a chuck 60. The forward end of the armature shaft 50 is formed with a pinion 61 meshing with a spur gear 62 fixed to the output shaft 57, whereby when power is supplied to the motor components, rotation of the output shaft 57 is effected.

Each of the sections 10, 11, at their forward ends, are formed to provide a cylindrical flange 65. This flange is encircled by a skirt 67 formed on a cap 68. The skirt 67, FIGURE 1, has sliding frictional engagement with the casing flange 65. The cap 68 is fixedly secured to the gear housing 40, as by screws 70, extending through the cap and being threaded into apertures formed in the front end of the gear housing, see FIGURES 2, 3 and 6. With this arrangement, the gear housing of the power unit is permitted to move by expansion and contraction, relative to the casing sections 10, 11.

The brush holders 30, positioned in the slots 28, are formed of sheet metal and are U-shaped in cross section. The inner or bottom walls of the slots 28 are formed with apertures 73, see FIGURES 4 and 11. The side walls of the brush holders 30 are formed with tangs 75, which extend through the apertures 73, clinched over to retain the brush holders properly positioned in the slots 28. The outer wall 77 of the brush holders is bent over, as at 78, FIGURE 1, to provide a surface against which the brush springs 80 engage. The inner ends of the outer walls 77 of the brush holders are formed with tabs 81, which are bent outwardly and to which the conductors 82 are connected. A collar 83 is mounted on the insulating sleeve 54 and arranged in abutting relation to the commutator 55. A dished spring washer 84 is mounted intermediate the collar 83 and the bearing 51. The concave side of the washer confronts the sleeve 83 and the peripheral edges are formed with teeth that engage the collar, whereby the dished washer 84 rotates with the collar and has running engagement against the bearing 51.

The motor components are maintained at proper operating temperature by a fan 85 mounted on the armature shaft 50 rearwardly of the front ring portion 20, see FIGURE 1. Preferably, a group of fan blades, as 87, FIGURE 8, located at opposite sides of the armature shaft 50, are of greater length than the remainder of the fan blades 89. The blades 87 having a greater dimension are effective to move a greater volume of air. Yet, the armature may be inserted in the frame and the field 45, when the longer blades 87 are positioned in registration with the top and bottom arcuate surfaces 23 of the ring member 20, as shown in FIGURE 8. The casing sections 10, 11, are formed with semi-annular flanges 90 arranged rearwardly of the fan 85 to direct the air flow moving over the motor parts to the central area of the fan. Each of the casing sections 10, 11, are formed with apertures 93, see FIGURE 9, arranged in registration with the commutator 55. The casing sections 10, 11, are formed with apertures 95. These apertures are located in registration with the fan 85 for the discharge of heated air therefrom.

A switch 100 is mounted at the handle portion 15 for controlling the power supply to the motor. The switch is fixedly trapped in the handle portions 15 of the sections by the ends of a switch supporting plate 101, being positioned in notches formed in projections 102. The switch is provided with an actuator 103. The front surface or side of the handle 15 is formed with a notch 104, in which there is slidably mounted a trigger 105 for fore-and-aft movement. The trigger 105 is formed with a downwardly facing notch 106 receiving the switch actuator 103. When the trigger is moved rearwardly, the switch is actuated to "on" position to provide power for the motor. The inner or rearward portion of the trigger 105 is formed with a cylindrical portion 107, which is mounted between a rib 102, and a rib 108, whereby the trigger may be moved forwardly and rearwardly, and upwardly and downwardly about the pivotal connection 107. A helical compression spring 109 is mounted in the handle structure and exerts a pressure on the trigger 105 urging it forwardly and downwardly about the pivotal support 107. The forward top edge of the trigger is provided with a shoulder or notch 110. When the trigger is moved rearwardly to supply power to the motor, it may be moved upwardly to bring the notch 110 into engagement with the top end wall 111 of the slot, as illustrated in FIGURE 5. The shoulder 110 is inclined upwardly and forwardly, and the top end wall of the notch is formed in a complemental manner. Accordingly, the shoulder 110 is held against the end wall 111 by the action of the spring 109, and the tool will operate continuously without the necessity of the operator exerting a squeeze pressure on the trigger 105. When the trigger is moved rearwardly slightly and permitted to swing downwardly about the pivot mounting 107 and released, the trigger will move forwardly to the "off" position, as shown in FIGURE 1. Power is supplied to the tool through the switch 100 by the conventional power cord 113.

Each of the sections 10, 11, are formed in the outer surface of their medial top portion with mating depressions forming a recess for the reception of a clamping clip 112 and a name-plate 114. The sides of this recess are defined by an aperture 115 extending in a direction parallel to the abutting edge of the section. The outer wall of the aperture 115 is formed with a portion 116 inclining downwardly and inwardly, and merging with a shoulder 117. Intermediate the inner wall 118 of the aperture 115, and the edge 119 of the section, there is a bead 120. The spring clip 112 is formed with inwardly curved flanges 121 engaging the beads 120 of the casing sections clamping the same together. The nameplate 114 is dimensioned comparable to the recess, and is mounted therein by springing the side edges of the nameplate into the apertures 115, with the side edges of the nameplate engaging the shoulders 117, as shown in FIGURE 7. With this arrangement, the name plate 114 is interlocked with the casing and has substantially the same curved configuration as that of the casing. Preferably, the clip member 112 is formed with tabs 123 extending through apertures in the nameplate 114 and being bent over, as shown in FIGURE 13, to more securely affix the nameplate to the tool.

What we claim is:

1. An electrically powered hand tool comprising a hollow casing consisting of a pair of complemental mating sections formed of insulating material, means for securing said sections together, a power unit mounted in said casing, said unit including a frame formed of insulating material, a gear housing fixed to the forward end of said frame, a motor field fixedly mounted in said frame, an armature shaft journalled at one end in the rear portion of said frame and being journalled at its opposite end in said gear housing and extending therein, an armature mounted on said shaft, an insulating sleeve positioned between said shaft and armature, an output shaft journalled in said gear housing, gearing journalled in said housing and operatively connecting said armature shaft to said output shaft, the rear end of said frame and said casing being formed with interlocking portions, and means connecting said gear housing to said casing and operable to permit limited relative movement between said gear housing and said casing.

2. An electrically powered hand tool comprising a hollow casing consisting of a pair of complemental mating sections formed of insulating material, means for securing said sections together, a power unit mounted in said casing, said unit including a frame formed of insulating material, a gear housing fixed to the forward end of said frame, a motor field fixedly mounted in said frame, an armature shaft journalled at one end in the rear portion of said frame and being journalled at its opposite end in said gear housing and extending therein, an armature mounted on said shaft, an insulating sleeve positioned between said shaft and armature, an output shaft journalled in said gear housing, gearing journalled in said housing and operatively connecting said armature shaft to said output shaft, the rear end of said frame being interlocked with said casing against movement in a direction axially of said armature shaft, the forward ends of said sections being formed to provide a cylindrical flange encircling said output shaft, a cap having a skirt portion encircling said cylindrical flange for frictional engagement therewith, said cap being fixedly secured to the forward end of said gear housing.

3. An electrically powered hand tool comprising a hollow casing, a power unit mounted in said casing, said power unit including a one-piece integral frame molded from plastic material and having a front ring portion with the vertical dimension greater than the transverse horizontal dimension, a pair of rib members extending rearwardly from said ring portion and being connected thereto at the bottom and top thereof, said rib members extending in spaced apart relation and merging at their rear ends with a vertically disposed rear end wall, a motor field member having diametrically opposed flat peripheral surfaces and intermediate diametrically opposed curved peripheral surfaces formed on a radius complemental to the spacing between said rib members, a gear housing fixedly assembled on the forward side of said ring portion, an armature positioned in said field member and having its shaft journalled at one end in said rear end wall, the opposite end of said armature shaft being journalled in said gear housing and extending therein, an output shaft journalled in said gear housing, gearing journalled in said housing and operatively connecting said armature shaft to said output shaft, a cooling fan mounted on said armature shaft rearwardly of said ring portion and having certain blades formed on a radius complemental to the radius of the transverse dimension of said ring portion, and other blades formed on a radius complemental to the radius of the major dimension of said ring portion, whereby said armature may be moved axially into said frame and field member prior to the assembly of the gear housing to said ring portion.

4. An electrically powered hand tool as set forth in claim 3 wherein the rear end wall of said frame is provided with projections interlocking with said casing to restrain movement of said frame in a direction axially of said armature shaft, and said gear housing is free to move relative to said casing in a direction lengthwise of said armature shaft.

5. An electrically powered hand tool including a casing formed of a pair of complemental concave mating sections molded of plastic material, said sections being joined together with their perimetric edges in abutting engagement, said sections being formed in their outer surfaces with mating depressions extending laterally from the joint between the sections to form a recess, the sides of said recess being defined by apertures extending lengthwise of the casing, each casing section being formed with a bead intermediate said aperture and the abutting edge of the section, a clip member positioned in said recess and extending transversely across the joint between said sections, said clip member having side flanges interlocking with said beads to clamp said sections in abutting relation, and a convex nameplate positioned in said recess overlying said clip member and having its side edges extending into said apertures and having interlocking engagement with the outer walls of said apertures.

6. An electrically powered hand tool comprising a casing, a power unit mounted in said casing and including a frame having end walls, aligned bearings mounted in said end walls, an armature shaft journalled at its ends in said bearings, an armature on said shaft and having a commutator, a sleeve of insulating material positioned on said shaft intermediate said commutator and one of said bearings, a dished washer mounted on said shaft with the concave side of said washer confronting said sleeve and with the peripheral edge of said washer interlocking with said sleeve for rotation therewith, the convex side of said washer abutting against said bearing.

7. An electrically powered hand tool as set forth in claim 5, wherein said clip member is formed with tabs having interlocking engagement with said nameplate.

References Cited
UNITED STATES PATENTS

| 2,456,571 | 12/1948 | Turner | 310—50 |
| 2,876,369 | 3/1959 | Doerner | 310—50 |
| 3,121,813 | 11/1960 | Pratt | 310—50 |
| 3,344,291 | 9/1967 | Pratt | 310—50 |

MILTON O. HIRSHFIELD, *Primary Examiner.*

G. NUNEZ, *Assistant Examiner.*